United States Patent
Wang et al.

(10) Patent No.: US 12,316,544 B2
(45) Date of Patent: May 27, 2025

(54) METHOD AND APPARATUS FOR CONTROLLING DATA PACKET SENDING, MODEL TRAINING METHOD AND APPARATUS, AND SYSTEM

(71) Applicant: HUAWEI TECHNOLOGIES CO., LTD., Shenzhen (CN)

(72) Inventors: Wei Wang, Beijing (CN); Yiyang Shao, Beijing (CN); Kai Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 400 days.

(21) Appl. No.: 17/750,639

(22) Filed: May 23, 2022

(65) Prior Publication Data

US 2022/0286402 A1    Sep. 8, 2022

Related U.S. Application Data

(63) Continuation of application No. PCT/CN2020/111834, filed on Aug. 27, 2020.

(30) Foreign Application Priority Data

Nov. 30, 2019   (CN) .......................... 201911209073.0

(51) Int. Cl.
*H04L 47/11* (2022.01)
*H04L 47/10* (2022.01)
*H04L 47/283* (2022.01)

(52) U.S. Cl.
CPC .............. *H04L 47/11* (2013.01); *H04L 47/10* (2013.01); *H04L 47/283* (2013.01)

(58) Field of Classification Search
None
See application file for complete search history.

(56) References Cited

U.S. PATENT DOCUMENTS

| | | | |
|---|---|---|---|
| 11,582,184 B2* | 2/2023 | Day | H04L 47/10 |
| 2011/0013511 A1* | 1/2011 | Li | H04W 28/0242 370/231 |

(Continued)

FOREIGN PATENT DOCUMENTS

| | | |
|---|---|---|
| CN | 103929777 A | 7/2014 |
| CN | 106302230 A | 1/2017 |

(Continued)

OTHER PUBLICATIONS

Priscoli et al., "Multi-Model Reference Control for Queue-Based Resource Management in Communication Networks", IEEE, Dec. 14-17, 2004, 6 pages.

(Continued)

*Primary Examiner* — Anh Vu H Ly
(74) *Attorney, Agent, or Firm* — Maier & Maier, PLLC

(57) ABSTRACT

A controlling data packet sending method. The method for controlling data packet sending includes: obtaining a plurality of control models, where the plurality of control models corresponds to a plurality of conditions; selecting, based on a first condition, a first control model corresponding to the first condition from the plurality of control models, the first control model is used to process a transmission parameter of any network in at least one network; processing, by using the first control model, a transmission parameter of a first network accessed by an end node, to obtain a first control parameter required for sending the data packet of the first application by the end node by using the first network; and controlling sending of the data packet of the first application based on the first control parameter.

20 Claims, 7 Drawing Sheets

(56) References Cited

U.S. PATENT DOCUMENTS

| | | | |
|---|---|---|---|
| 2018/0124632 A1 | 5/2018 | Thubert et al. | |
| 2018/0375956 A1* | 12/2018 | Chan | H04L 47/74 |
| 2019/0068512 A1* | 2/2019 | Papaloukopoulos | H04L 41/145 |
| 2020/0193969 A1* | 6/2020 | Li | G10L 15/063 |
| 2022/0345377 A1* | 10/2022 | Sawabe | H04L 41/16 |

FOREIGN PATENT DOCUMENTS

| | | |
|---|---|---|
| CN | 106533970 A | 3/2017 |
| CN | 107171842 A | 9/2017 |
| CN | 107634911 A | 1/2018 |
| CN | 109361601 A | 2/2019 |
| CN | 109905918 A | 6/2019 |
| WO | 2019192361 A1 | 10/2019 |

OTHER PUBLICATIONS

Intel Corporation, "QoS Aware Congestion Control for NR V2X Communication", 3GPP TSG RAN WG1 Meeting #98bis, R1-1910654, Chongqing, China, Oct. 14-20, 2019, 12 pages.

Ding, "Requirements-driven and multi-homed-based multipath TCP congestion control algorithm for vehicular network", Journal on Communications, vol. 37, No. 7, Jul. 2016, 11 pages (Including English abstract).

Jay et al., "Internet Congestion Control via Deep Reinforcement Learning", 32nd Conference on Neural Information Processing Systems, Montreal, Canada, 2018, 10 pages.

Yu, "On Congestion Control Based on Active Queue Management Algorithms", 2012, 2 pages (Including English abstract).

Yan et al., "Pantheon: the training ground for Internet congestion-control research", USENIX Annual Technical Conference, Jul. 11-13, 2018, Boston, MA, USA, 14 pages.

Jacobson, "Modified TCP congestion avoidance algorithm", 1990, 8 pages.

Brakmo et al., "TCP Vegas: End to End Congestion Avoidance on a Global Internet", IEEE J. on Selected Areas in Communications, vol. 13, No. 8, Oct. 1995, 16 pages.

Ha et al., "Cubic: A New TCP-Friendly High-Speed TCP Variant", 2005, 11 pages.

Cardwell et al., "BBR: Congestion-Based Congestion Control", 2016, 34 pages.

\* cited by examiner

METHOD AND APPARATUS FOR CONTROLLING DATA PACKET SENDING, MODEL TRAINING METHOD AND APPARATUS, AND SYSTEM

CROSS-REFERENCE TO RELATED APPLICATIONS

This application is a continuation of International Application No. PCT/CN2020/111834, filed on Aug. 27, 2020, which claims priority to Chinese Patent Application No. 201911209073.0, filed on Nov. 30, 2019. The disclosures of the aforementioned applications are hereby incorporated by reference in their entireties.

TECHNICAL FIELD

The embodiments relate to the field of network technologies, and a method and an apparatus for controlling data packet sending, a model training method and apparatus, and a system.

BACKGROUND

A network transmission system usually includes a plurality of end nodes, and any end node may send a data packet to another end node by using a network accessed by the any end node. When any end node sends excessive data packets or a rate of sending a data packet by the any end node is excessively high, congestion may occur in a network, and data packet transmission efficiency is reduced. To prevent network congestion, data packet sending of the any end node needs to be controlled.

Currently, any end node can usually process a network transmission parameter (for example, a round-trip time, a transmit rate, and a packet loss rate) based on a congestion control algorithm and obtain a control parameter required for sending a data packet by the end node. Then, the end node may control data packet sending based on the control parameter, and the control parameter may be a congestion window value or a transmit rate.

However, any end node that controls data packet sending based on the control parameter obtained based on the congestion control algorithm usually cannot effectively resolve a network congestion problem.

SUMMARY

A method and an apparatus for controlling data packet sending, a model training method and apparatus, and a system may better reduce impact of network congestion and prevent network congestion.

According to a first aspect, a method for controlling data packet sending is provided. The method is applied to an end node, and the end node runs a first application. The method includes: obtaining a plurality of control models, where the plurality of control models are corresponding to a plurality of conditions; selecting, based on a first condition, a first control model corresponding to the first condition from the plurality of control models, where the first condition is used to indicate a congestion control requirement of the first application, the first control model is used to process a transmission parameter of any network in at least one network, to obtain a control parameter required for sending a data packet of the first application by using the any network, the control parameter is used to control sending of the data packet of the first application, so that the any network meets the congestion control requirement of the first application, and the control parameter includes at least one of a congestion window and a transmit rate; processing, by using the first control model, a transmission parameter of a first network accessed by the end node, to obtain a first control parameter required for sending the data packet of the first application by the end node by using the first network; and controlling sending of the data packet of the first application based on the first control parameter.

The plurality of control models may be in a one-to-one correspondence to the plurality of conditions, and conditions corresponding to different control models are different. The congestion control requirement may represent a transmission requirement of the first application for the network. Optionally, the congestion control requirement may be that a throughput is greater than a throughput threshold and bandwidth utilization is greater than a bandwidth utilization threshold, or the congestion control requirement may be that a throughput is greater than a throughput threshold and a time difference is within a preset range.

It should be noted that the end node may first obtain the plurality of control models, and then select the first control model from the plurality of control models based on the first condition used to indicate the congestion control requirement of the first application. Then, the end node may process, by using the first control model, the transmission parameter of the first network accessed by the end node, to obtain the first control parameter required for sending the data packet of the first application by the end node by using the first network, and control sending of the data packet of the first application based on the first control parameter. Because the first control parameter output by the first control model can control sending of the data packet of the first application, so that the first network meets the congestion control requirement of the first application, impact of network congestion can be better alleviated, which also has an effect on preventing network congestion.

Optionally, the first condition is further used to indicate an environment of the at least one network, and each network in the at least one network has a different environment. In this case, the control model corresponding to the first condition is used to process a network transmission parameter that has the environment, of the network that is indicated by the first condition.

Optionally, a part of the first condition that is used to indicate the environment of the at least one network includes a range of at least one of the following first parameters: a maximum bandwidth, a minimum round-trip time, a random packet loss rate, and a size of a buffer. The maximum bandwidth means a maximum quantity of bytes that can be transmitted by using the network per second. A random packet loss means a random packet loss caused by a physical factor of the network (for example, a frequency band conflict and a weak signal). A ratio of a quantity of randomly lost packets to a quantity of all data packets transmitted on a network is a random packet loss rate. The buffer includes storage space that is in a routing/switching device in the network and that is used to cache a data packet sent by the end node.

Optionally, before the processing, by using the first control model, a transmission parameter of a first network accessed by the end node, to obtain a first control parameter required for sending the data packet of the first application by the end node by using the first network, the method further includes: determining the transmission parameter of the first network based on at least one of a current status parameter of the first network and a historical status parameter of the first network.

Optionally, the transmission parameter includes at least one of the following second parameters: a round-trip time; a time difference, where the time difference is a difference between a current value of the round-trip time and a minimum historical value of the round-trip time; a transmit rate; a receive rate; a packet loss rate; a value of an explicit congestion notification carried in a data packet on the network; a congestion window value; the round-trip time obtained after regularization processing; the time difference obtained after regularization processing; the transmit rate obtained after regularization processing; the receive rate obtained after regularization processing; the packet loss rate obtained after regularization processing; the value of the explicit congestion notification carried in the data packet on the network that is obtained after regularization processing; and the congestion window value obtained after regularization processing.

In a process in which a control model is obtained through training, when an amount of training data is excessively small or the control model is excessively trained, accuracy of a control parameter output by the control model is relatively low (that is, overfitting occurs in the control model). When the transmission parameter of the first network includes: the RTT obtained after regularization processing; the time difference obtained after regularization processing; the transmit rate obtained after regularization processing; the receive rate obtained after regularization processing; the packet loss rate obtained after regularization processing; the value of the explicit congestion notification carried in the data packet on the network that is obtained after regularization processing; and/or the congestion window value obtained after regularization processing, because overfitting of the first control model can be suppressed by the regularization processing, accuracy of a control parameter subsequently output by the control model can be improved.

Optionally, the transmission parameter further includes: a change value corresponding to a target parameter in the at least one second parameter, the change value corresponding to the target parameter is related to a change amount of a current value relative to a historical value of the target parameter, and the target parameter is any parameter in the at least one second parameter. The historical value of the target parameter means a value of the target parameter at a historical moment before a current moment. Optionally, duration between the historical moment and the current moment may be k times an RTT at the current moment.

Optionally, the first condition includes an identifier of the control model corresponding to the first condition. In addition, different control models are corresponding to different identifiers of control models. Therefore, a developer may configure the identifier of the first control model in the first application, and the end node selects, based on the identifier of the control model that is configured in the first application, the control model corresponding to the identifier of the control model from the plurality of control models as the first control model.

Optionally, after the controlling sending of the data packet of the first application based on the first control parameter, the method further includes: repeatedly executing a sending control procedure; and the sending control procedure includes: processing, by using the first control model, the transmission parameter of the first network accessed by the end node, to obtain the first control parameter required for sending the data packet of the first application by the end node by using the first network, and controlling sending of the data packet of the first application based on the first control parameter.

Because the transmission parameter of the first network may change, the sending control procedure may be repeatedly executed, to implement real-time control on sending of the data packet of the first application, thereby solving a network congestion problem more effectively.

Optionally, the method further includes: after the controlling sending of the data packet of the first application based on the first control parameter, sending at least one data packet of the first application by using the first network, where the sending control procedure further includes: sending the at least one data packet by using the first network. The end node may repeatedly execute the sending control procedure based on a target interval. The target interval may be a function of the RTT at the current moment. The repeatedly executing a sending control procedure includes: if an acknowledgement ACK packet of the at least one data packet is received by using the first network, repeatedly executing the sending control procedure.

For example, an interface that is used to store a time interval between the current moment and a moment at which the sending control procedure is most recently executed is disposed in the end node. The end node may obtain, by reading the interface, the time interval between the current moment and the moment at which the sending control procedure is most recently executed, to determine whether the time interval is equal to the target interval. If the time interval is equal to the target interval, the end node may repeatedly execute the sending control procedure.

Optionally, the method further includes: obtaining training data corresponding to any condition of the plurality of conditions, where the training data corresponding to the any condition includes a transmission parameter of the at least one network and a control parameter corresponding to any network in the at least one network, and the control parameter corresponding to the any network is used to control sending of a data packet in the any network, so that the any network meets a congestion control requirement indicated by the any condition; and training an initial model based on the training data corresponding to the any condition, to obtain a control model corresponding to the any condition.

When the any condition is used to indicate the congestion control requirement of the first application, the control parameter included in the training data corresponding to the any condition is used to control data packet sending on the at least one network, so that the at least one network meets the congestion control requirement of the first application. The control parameter may be a congestion window value or a loss function value. Optionally, the any condition may be further used to indicate the environment of the at least one network.

The control parameter included in the training data corresponding to the any condition may be determined by a training subsystem in a manner preconfigured by the developer. For example, the developer may configure a calculation formula of the control parameter based on the congestion control requirement indicated by the any condition.

Optionally, before the obtaining training data corresponding to any condition of the plurality of conditions, the method further includes: forwarding a data packet sent by a first node by using the any network; and forwarding a data packet sent by a second node by using the any network; and the obtaining training data corresponding to any condition of the plurality of conditions includes: obtaining the training data corresponding to the any condition based on transmission, on the any network, of the forwarded data packet sent by the first node and the forwarded data packet sent by the second node. Optionally, the training subsystem may alternatively control the first node to send a data packet by using the at least one network.

For example, the training subsystem may alternatively control the second node to send a data packet by using the network in which the first node sends the data packet. For example, the training subsystem may control the second node to send the data packet at a rate in a target sending mode by using the network in which the first node sends the data packet. For example, the target sending mode may be a sending mode of a to-be-controlled data packet.

According to a second aspect, a model training method is provided. The method includes: obtaining training data corresponding to any condition of a plurality of conditions, where the training data corresponding to the any condition includes a transmission parameter of at least one network and a control parameter corresponding to any network in the at least one network, the any condition is used to indicate a congestion control requirement of an application, the control parameter corresponding to the any network is used to control sending of a data packet in the any network, so that the any network meets the congestion control requirement indicated by the any condition, and the control parameter includes at least one of a congestion window and a transmit rate; and training an initial model based on the training data corresponding to the any condition, to obtain a control model corresponding to the any condition, where the control model corresponding to the any condition is used to process a transmission parameter of the any network in the at least one network, to obtain the control parameter corresponding to the any network.

Optionally, before the obtaining training data corresponding to any condition of a plurality of conditions, the method further includes: forwarding a data packet sent by a first node by using the any network; and forwarding a data packet sent by a second node by using the any network; and the obtaining training data corresponding to any condition of a plurality of conditions includes: obtaining the training data corresponding to the any condition based on transmission, on the any network, of the forwarded data packet sent by the first node and the forwarded data packet sent by the second node.

Optionally, each network in the at least one network has a different environment. For example, each network in the at least one network has a different value for at least one of the following parameters: a maximum bandwidth, a minimum round-trip time, a random packet loss rate, and a size of a buffer, and the buffer includes storage space that is in a routing/switching device in the network and that is used to cache a data packet sent by an end node.

Optionally, the transmission parameter includes at least one of the following second parameters: a round-trip time; a time difference, where the time difference is a difference between a current value of the round-trip time and a minimum historical value of the round-trip time; a transmit rate; a receive rate; a packet loss rate; a value of an explicit congestion notification carried in a data packet on the network; a congestion window value; the round-trip time obtained after regularization processing; the time difference obtained after regularization processing; the transmit rate obtained after regularization processing; the receive rate obtained after regularization processing; the packet loss rate obtained after regularization processing; the value of the explicit congestion notification carried in the data packet on the network that is obtained after regularization processing; and the congestion window value obtained after regularization processing.

Optionally, the transmission parameter further includes: a change value corresponding to a target parameter in the at least one second parameter, the change value corresponding to the target parameter is related to a change amount of a current value relative to a historical value of the target parameter, and the target parameter is any parameter in the at least one second parameter.

According to a third aspect, an apparatus for controlling data packet sending is provided. The apparatus is applied to an end node, the apparatus for controlling data packet sending includes a first application and a protocol stack, and the protocol stack is configured to perform any one of the methods for controlling data packet sending according to the first aspect.

According to a fourth aspect, a model training apparatus is provided. The model training apparatus includes modules configured to perform any one of the model training methods according to the second aspect.

According to a fifth aspect, an apparatus for controlling data packet sending is provided. The apparatus for controlling data packet sending includes a memory and a processor. The processor is configured to execute a program stored in the memory, to implement any one of the methods for controlling data packet sending according to the first aspect.

According to a sixth aspect, a model training apparatus is provided. The model training apparatus includes a memory and a processor. The processor is configured to execute a program stored in the memory, to implement any one of the model training methods according to the second aspect.

According to a seventh aspect, a computer storage medium is provided. The storage medium stores a computer program, and the computer program is executed by a processor to implement any one of the methods for controlling data packet sending according to the first aspect.

According to an eighth aspect, a computer storage medium is provided. The storage medium stores a computer program, and the computer program is executed by a processor to implement any one of the model training methods according to the second aspect.

According to a ninth aspect, a computer program product including instructions is provided. When the computer program product runs on a computer, the computer is enabled to perform any one of the methods for controlling data packet sending according to the first aspect, or the computer is enabled to perform any one of the model training methods according to the second aspect.

According to a tenth aspect, a network transmission system is provided. The network transmission system includes an apparatus for controlling data packet sending and/or a model training apparatus, the apparatus for controlling data packet sending is any one of the apparatuses for controlling data packet sending according to the third aspect or the fifth aspect, and the model training apparatus is any one of the model training apparatuses according to the fourth aspect or the sixth aspect.

DETAILED DESCRIPTION OF THE EMBODIMENTS

To make objectives, solutions, and advantages clearer, the following further describes implementations in detail with reference to the accompanying drawings.

A network transmission system usually includes a plurality of end nodes, and a transmit end of any end node may send a data packet to another end node by using a network accessed by the any end node. With rapid development of communications technologies and Internet technologies, various types of applications emerge, and the various types of applications have increasingly high requirements on transmission efficiency of a network transmission system. However, when any end node runs an application, if the any end node sends excessive data packets or a rate at which the any end node sends a data packet is excessively high, congestion may occur on a network accessed by the any end node, data packet transmission efficiency is reduced, and running of the application is further affected. To prevent network congestion, the any end node needs to control a sending status of a data packet.

Figure 1:
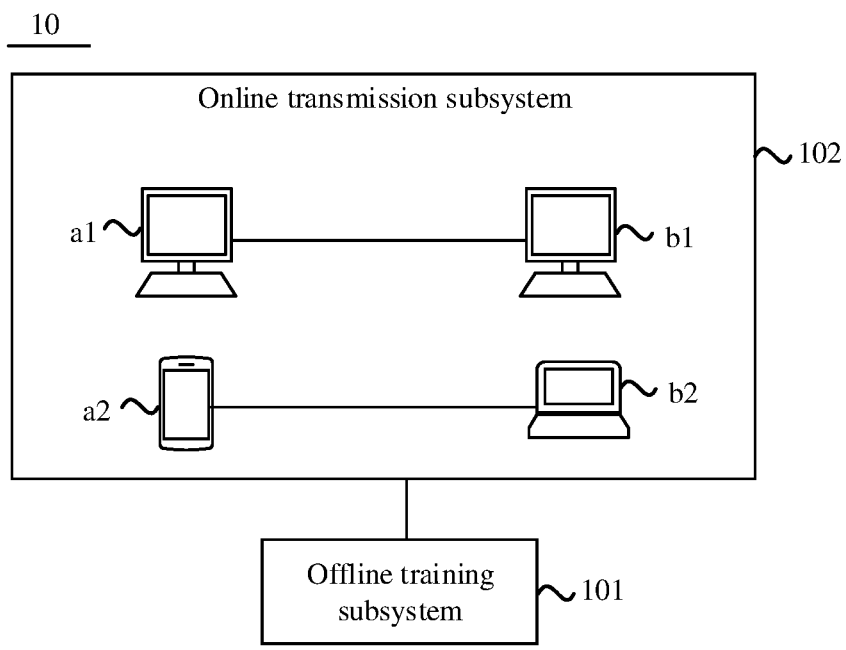
FIG. 1 is a schematic diagram of a structure of a network transmission system according to an embodiment.

FIG. 1 is a schematic diagram of a structure of a network transmission system 10 according to an embodiment. The network transmission system 10 includes a training subsystem 101 and a transmission subsystem 102. The transmission subsystem 102 includes a plurality of end nodes (four end nodes are shown in FIG. 1). The plurality of end nodes may be divided into two transmit ends and two receive ends based on transmission directions of data packets. The two transmit ends include a transmit end a1 and a transmit end a2, and the two receive ends include a receive end b1 and a receive end b2. A network connection is established between the transmit end a1 and the receive end b1, and a network connection is established between the transmit end a2 and the receive end b2. The network connection may include an optical fiber connection, a twisted pair connection, and a radio channel connection. This is not limited in this embodiment. Optionally, the transmission subsystem may be an online transmission subsystem, and the training subsystem may be an online or offline training subsystem. The end node may include a computer, a mobile phone, a server, and an Internet of Things device. When the end node is a computer, a server, or an Internet of Things device, an operating system of the end node may be an operating system (for example, a Linux system or a Windows system) used by any computer or terminal.

The training subsystem 101 is configured to: train an initial model to obtain a control model and send the obtained control model to the transmission subsystem 102. Any end node in the transmission subsystem 102 is configured to control data packet sending based on the received control model. It should be noted that FIG. 1 is described by using an example in which the training subsystem 101 and the transmission subsystem 102 are mutually independent. The training subsystem 101 and the transmission subsystem 102 may alternatively be integrated into one system. In this case, the system is configured to train the initial model to obtain a control model. Any end node in the system is configured to control data packet sending based on the control model. This is not limited in this embodiment.

Figure 2:
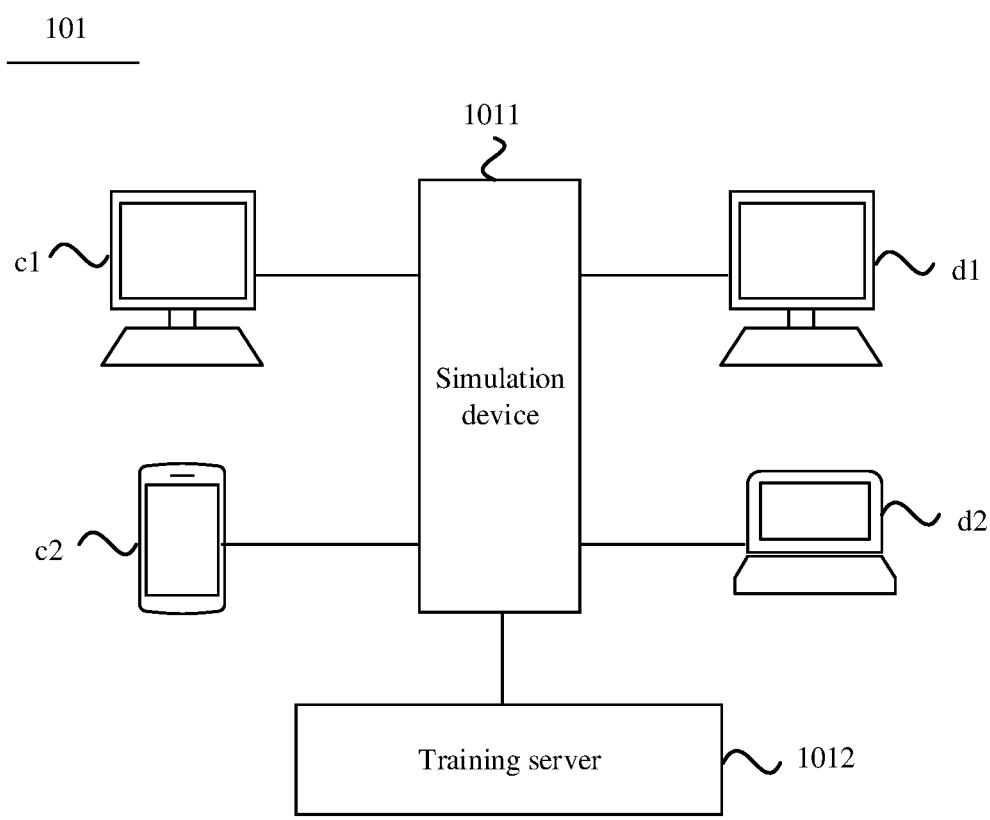
FIG. 2 is a schematic diagram of a structure of a training subsystem according to an embodiment.

Optionally, FIG. 2 is a schematic diagram of a structure of a training subsystem according to an embodiment. The training subsystem 101 includes a simulation device 1011, a training server 1012, and a plurality of training nodes (four training nodes are shown in FIG. 2). The plurality of training nodes may be divided into two training transmit ends and two training receive ends based on transmission directions of data packets. The two training transmit ends include a transmit end c1 and a transmit end c2, and the two training receive ends include a receive end d1 and a receive end d2. The simulation device 1011 is configured to establish a simulation network, and the plurality of training nodes perform data transmission by using the simulation network. For example, the training subsystem 101 may be TensorFlow (an open-source software library for machine learning), and the simulation device 1011 may be a software virtual switch (for example, Open vSwitch).

In a process of obtaining a control model through training by the training subsystem, the simulation device 1011 is configured to: obtain a training sample and send the training sample to the training server 1012. The training server 1012 is configured to train an initial model based on the training sample to obtain a control model. FIG. 2 is described by using an example in which the simulation device 1011 and the training server 1012 are mutually independent. Optionally, the simulation device 1011 and the training server 1012 may alternatively be integrated into one device. For example, the simulation device 1011 and the training server 1012 may be different modules in a device or may be a same module in a device. This is not limited in this embodiment. When the simulation device 1011 and the training server 1012 are a same module in a device, the simulation device 1011 does not need to send a training sample to the training server 1012, and the training server 1012 may directly obtain the training sample.

A related technology provides a solution of controlling data packet sending in a transmission subsystem based on a control model obtained through training by a training subsystem. The training subsystem in the related technology usually includes a simulation device, a training server, a training transmit end, and a training receive end. The simulation device pre-establishes a simulation network between the training transmit end and the training receive end. Then, the simulation device obtains a transmission parameter of the simulation network from the training transmit end and determines a control parameter. The simulation device then sends the transmission parameter of the simulation network and the control parameter to the training server as a training sample. The training server trains an initial model based on the training sample to obtain a control model, and then sends the control model to any end node in the transmission subsystem. The any end node inputs, to the control model, a transmission parameter of a network accessed by the any end node, to obtain a control parameter output by the control model. Then, the any end node controls data packet sending based on the control parameter output by the control model.

However, different types of applications require a network of a transmission subsystem to meet different transmission conditions. For example, an application of a file uploading/downloading type requires the network of the transmission subsystem to meet a transmission condition: A throughput is greater than a throughput threshold and bandwidth utilization is greater than a utilization threshold. For a video application, a transmission condition that needs to be met by the network of the transmission subsystem is that a throughput is greater than a throughput threshold and a time difference is within a preset range. In the related technology, when a control model obtained through training by the training subsystem is used to control data packet sending, the network of the transmission subsystem cannot meet transmission conditions required by various types of applications. As a result, a network congestion problem cannot be effectively resolved in the related technology.

Figure 3:
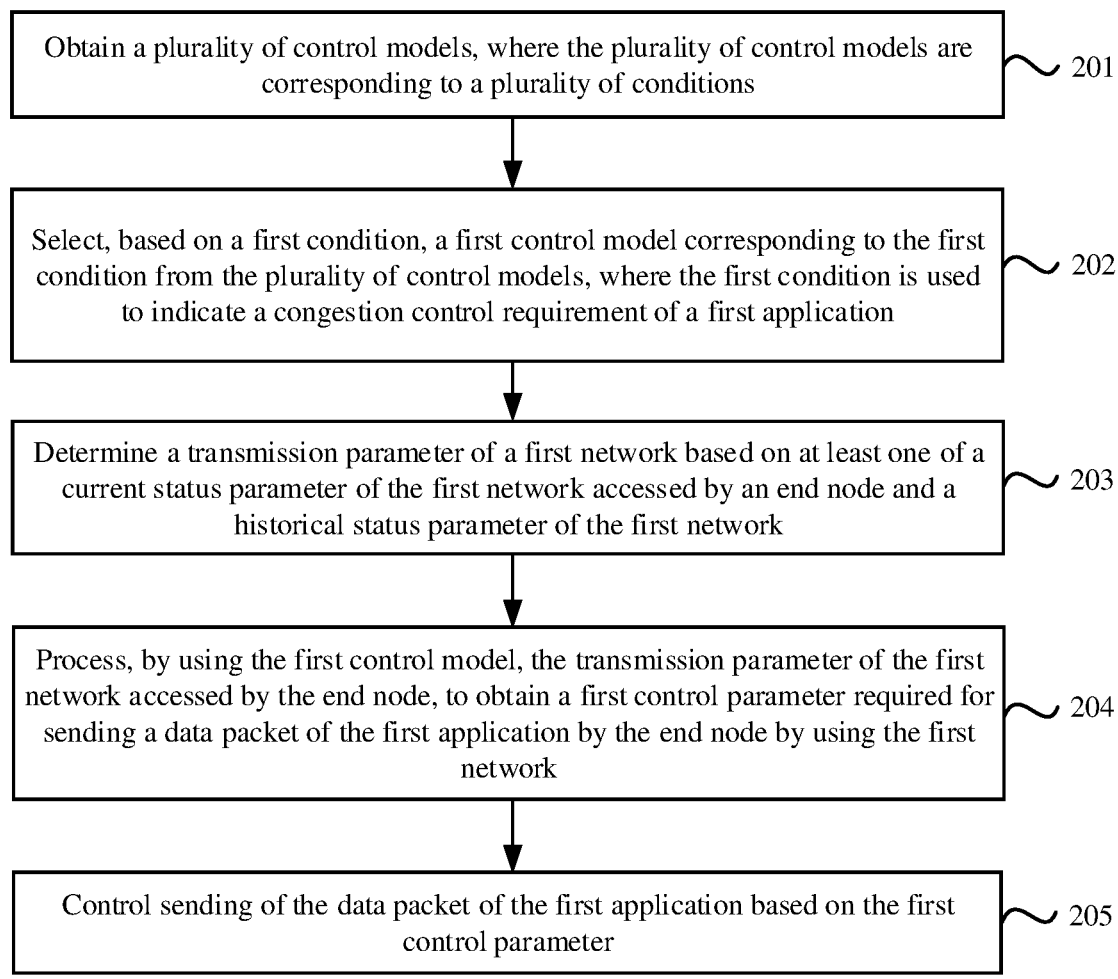
FIG. 3 is a flowchart of a method for controlling data packet sending according to an embodiment.

An embodiment provides a method for controlling data packet sending. The method may be applied to an end node in a transmission subsystem, such as any transmit end in the transmission subsystem 102 shown in FIG. 1. The end node may run a first application. For example, FIG. 3 is a flowchart of a method for controlling data packet sending according to an embodiment. The method may include the following steps.

Step 201: Obtain a plurality of control models, where the plurality of control models corresponds to a plurality of conditions.

Any control model in the plurality of control models is used to process a transmission parameter of any network in at least one network, to obtain a control parameter required for sending a data packet of an application by using the any network, and the control parameter is used to control sending of the data packet of the application, so that the any network meets a congestion control requirement of the application.

The plurality of control models may be in a one-to-one correspondence to the plurality of conditions. Optionally, any condition in the plurality of conditions may be used to indicate a congestion control requirement of an application, and conditions corresponding to different control models are different. When any condition is used to indicate the congestion control requirement of the application, a control parameter output by a control model corresponding to the any condition is used to control sending of a data packet of the application, so that the any network meets the congestion control requirement of the application.

The congestion control requirement may represent a transmission requirement of the application for the network. Optionally, the congestion control requirement may be that a throughput is greater than a throughput threshold and bandwidth utilization is greater than a bandwidth utilization threshold, or the congestion control requirement may be that a throughput is greater than a throughput threshold and a time difference is within a preset range. For example, the throughput threshold may be 5000 bits/second (bit/s), the bandwidth utilization threshold may be 85%, and the preset range may be 28 milliseconds (ms) to 30 ms. The throughput means a quantity of bits that can be transmitted per second on a network accessed by an end node. The bandwidth utilization means a ratio of actual traffic transmitted on the network accessed by the end node to a maximum bandwidth of a link. The time difference means a difference between a current value of a round-trip time (RTT) and a minimum historical value of the RTT, and the RTT means duration between a moment at which the end node sends a data packet and a moment at which the end node receives an acknowledgment response, of the data packet, sent by another end node, where the another end node usually sends an acknowledgment response of the data packet to the end node immediately after receiving the data packet.

Optionally, the any condition may be further used to indicate an environment of the at least one network. In this case, the control model corresponding to the any condition is used to process a network transmission parameter that has the environment, of the network that is indicated by the any condition. A part of the any condition that is used to indicate the environment of the network may include a range of at least one of the following first parameters: a maximum bandwidth, a minimum RTT, a random packet loss rate, a size of a buffer, and the like. The maximum bandwidth means a maximum quantity of bytes that can be transmitted by using the network per second. A random packet loss means a random packet loss caused by a physical factor of the network (for example, a frequency band conflict and a weak signal). A ratio of a quantity of randomly lost packets to a quantity of all data packets transmitted on a network is a random packet loss rate. The buffer includes storage space that is in a routing/switching device in the network and that is used to cache a data packet sent by the end node, and the size of the buffer means a size of the storage space.

For example, Table 1 shows a one-to-one correspondence between a plurality of control models and a plurality of conditions. Table 1 is described by using an example in which the any condition is used to indicate the congestion control requirement of the application and the environment of the at least one network, and the part, of the any condition, that is used to indicate the environment of the network includes a range of a maximum bandwidth, a range of a minimum RTT, a range of a random packet loss rate, and a range of a size of a buffer. Refer to Table 1. A congestion control requirement, of the application, that is indicated by a condition corresponding to a control model 2 is as follows: A throughput is greater than a throughput threshold and bandwidth utilization is greater than a bandwidth utilization threshold, and an indicated environment of the at least one network is as follows: The range of a maximum bandwidth is 10 megabits per second (Mbps) to 200 Mbps, the range of a minimum RTT may be 50 ms to 200 ms, the range of a random packet loss rate may be 0% to 1%, and the range of a size of a buffer may be 0.1×bandwidth delay product (BDP) to 2×BDP. It should be noted that only an example correspondence between a control model and a condition is shown in Table 1. This is not limited.

TABLE 1

| | | Requirements Congestion control | | | |
|---|---|---|---|---|---|
| | Control models Requirements | Environment of at least one network indicated by a condition | | | |
| Control | requirements indicated by conditions | Range of a maximum bandwidth (Mbps) | Range of a minimum RTT (ms) | Range of a random packet loss rate (%) | Range of a size of a buffer |
| Control model 1 | The throughput is greater than the throughput threshold | 10 to 100(including 10 and 100) | 50 to 100(including 50 and 100) | 0% to 0.5% | 0.1 × BDP to 1 × BDP |

TABLE 1-continued

Requirements
Congestion control

| Control | Control models Requirements requirements indicated by conditions | Environment of at least one network indicated by a condition | | | |
|---|---|---|---|---|---|
| | | Range of a maximum bandwidth (Mbps) | Range of a minimum RTT (ms) | Range of a random packet loss rate (%) | Range of a size of a buffer |
| Control model 2 | The throughput is greater than the throughput threshold and the bandwidth utilization is greater than the bandwidth utilization threshold | 10 to 200 | 50 to 200 | 0% to 1% | 0.1 × BDP to 2 × BDP |
| Control model 3 | The bandwidth utilization is greater than the bandwidth utilization threshold | 100 to 200 | 100 to 200 | 0.5% to 1% | 1 × BDP to 2 × BDP |
| Control model 4 | The throughput is greater than the throughput threshold and the time difference is within the preset range | 10 to 300 | 50 to 300 | 0% to 2% | 0.1 × BDP to 3 × BDP |
| Control model 5 | The bandwidth utilization is greater than the bandwidth utilization threshold and the time difference is within the preset range. | 50 to 400 | 100 to 500 | 0% to 4% | 0.1 × BDP to 4 × BDP |

Usually, the transmission subsystem includes a model storage module. The model storage module stores a plurality of control models, a one-to-one correspondence between the plurality of control models and identifiers of the plurality of control models, and a one-to-one correspondence between the plurality of control models and the plurality of conditions. Optionally, the model storage module may be a hard disk, a storage card, or the like. The end node may obtain the plurality of control models from the model storage module, the one-to-one correspondence between the plurality of control models and the identifiers of the plurality of control models, and the one-to-one correspondence between the plurality of control models and the plurality of conditions. Optionally, the model storage module may be disposed in the end node or may be disposed in a device other than the end node in the transmission subsystem. This is not limited in this embodiment.

Step 202: Select, based on a first condition, a first control model corresponding to the first condition from the plurality of control models, where the first condition is used to indicate a congestion control requirement of the first application.

The end node runs the first application. When the end node runs the first application, the end node sends, by using a first network accessed by the end node, a target data packet of the first application to another end node.

For example, refer to step 201. The congestion control requirement may represent a transmission requirement of the application for the network. For example, the congestion control requirement of the first application may be: "the throughput is greater than the throughput threshold", which indicates that a transmission requirement of the first application for the first network accessed by the end node is a high throughput. Alternatively, the congestion control requirement of the first application may be: "the bandwidth utilization is greater than the bandwidth utilization threshold", which indicates that a transmission requirement of the first application for the first network is high bandwidth utilization. Alternatively, the congestion control requirement of the first application may be: "the time difference is within the preset range", which indicates that a transmission requirement of the first application for the first network is a stable time difference. Alternatively, the congestion control requirement of the first application may be: "the throughput is greater than the throughput threshold and the bandwidth utilization is greater than the bandwidth utilization threshold", which indicates that a transmission requirement of the first application for the first network is a high throughput and high bandwidth utilization. Alternatively, the congestion control requirement of the first application may be: "the throughput is greater than the throughput threshold and the time difference is within the preset range", which indicates that a transmission requirement of the first application for the first network is a high throughput and a stable time difference.

The congestion control requirement of the first application may be configured in the first application. Optionally, an operating system of the end node may be a Linux system or a Windows system. For example, when the operating system of the end node is the Linux system, a developer may add a new model configuration parameter (for example, tcp_congestion_requirement) to a target function (for example, a setsockopt function) of the first application, and then set a value of the model configuration parameter (for example, tcp_congestion_requirement) to a value used to indicate the congestion control requirement of the first application. Then, the developer may store the value of the model configuration parameter (for example, tcp_congestion_requirement) in a target variable (for example, a cc_requirement variable) of a target structure (for example, a tcp_sock structure) to configure the congestion control requirement of the first application. For example, a value of the new model configuration parameter (for example, tcp_congestion_requirement) may be set to "throughput". In this case, a congestion control requirement indicated by "throughput" is: "the throughput is greater than the throughput threshold". For another example, the value of the new model configuration parameter (for example, tcp_congestion_requirement) may be set to "time difference". In this case, the congestion control requirement indicated by "time difference" is "the time difference is within the preset range". For another example, the value of the new model configuration parameter (for example, tcp_congestion_requirement) may be set to "throughput, delay". In this case, a congestion control requirement indicated by "throughput, delay" is: "the throughput is greater than the throughput threshold and the time difference is within the preset range".

For example, refer to step 201. A part of the first condition that is used to indicate the environment of the at least one network may include a range of at least one of the following first parameters: a maximum bandwidth, a minimum RTT, a random packet loss rate, or a size of a buffer. That the first condition indicates that the environment of the first network may mean that a value of the first parameter of the first network belongs to the range of the first parameter that is indicated by the first condition.

Optionally, the any condition may further include an identifier of the control model corresponding to the any condition. In step 202, a first transmit end selects, based on the first condition, the first control model corresponding to the first condition from the plurality of control models in a plurality of manners. The following uses two of the manners as an example for description.

In a manner, as described in step 201, each control model is corresponding to an identifier of a control model, and different control models are corresponding to different identifiers of control models. Therefore, a developer may configure the identifier of the first control model in the first application, and the end node selects, based on the identifier of the control model that is configured in the first application, the control model corresponding to the identifier of the control model from the plurality of control models as the first control model.

For example, when the operating system of the end node is the Linux system, the developer may set a value of a model configuration parameter (for example, tcp_congestion) in the target function (for example, the setsockopt function) of the first application as the identifier of the first control model. For example, the developer may configure the value of the model configuration parameter (for example, tcp_congestion) of the first application as "1". In this case, the identifier, of the first control model, configured in the first application is 1.

In another manner, as described in step 201, because each control model is corresponding to one condition, conditions corresponding to different control models may be different, and the congestion control requirement of the first application is configured for the first application. Therefore, the end node may first obtain the one-to-one correspondence between the plurality of control models and the plurality of conditions. When the any condition indicates the congestion control requirement of the application, the end node may determine, based on the congestion control requirement configured in the first application, the first condition used to indicate the congestion control requirement of the first application. Then, the control model corresponding to the first condition is selected as the first control model based on the correspondence. When the any condition indicates the congestion control requirement of the application and the environment of the at least one network, the end node may determine, based on the congestion control requirement of the first application and the environment of the first network accessed by the end node, the first condition used to indicate the congestion control requirement of the first application and indicate the environment of the first network. Then, the control model corresponding to the first condition is selected as the first control model based on the correspondence.

For example, it is assumed that the any condition indicates the congestion control requirement of the application and the environment of the at least one network, and a part, of the any condition, that is used to indicate the environment of the at least one network includes the range of a maximum bandwidth, the range of a minimum round-trip time, the range of a random packet loss rate, and the range of a size of a buffer. The congestion control requirement of the first application is: "the throughput is greater than the throughput threshold and the bandwidth utilization is greater than the bandwidth utilization threshold", a value of a maximum bandwidth of the first network is 100 Mbps, a value of a minimum RTT of the first network is 100 ms, a value of a random packet loss rate of the first network is 0.5%, and a value of a size of a buffer of the first network is 1.5×BDP. The end node may determine, as the first condition, a condition that is used to indicate "the throughput is greater than the throughput threshold and the bandwidth utilization is greater than the bandwidth utilization threshold" and indicates an environment of the at least one network that includes the environment of the first network. Then, the end node selects the control model corresponding to the first condition as the first control model.

For example, when the operating system of the end node is the Linux system, the value of the model configuration parameter (for example, tcp_congestion_requirement) of the first application is used to indicate the congestion control requirement. Therefore, the end node may determine, by reading the value of the model configuration parameter (for example, tcp_congestion_requirement) of the first application, the congestion control requirement configured for the first application.

It should be further noted that, in step 202, after the first control model is selected, the end node may further run the first control model. For example, a cache module is disposed in the end node, and the end node may load the first control model from the model storage module into the cache module, to obtain a model instance of the first control model, and then run the first control model. Optionally, the end node may first detect whether a model instance of the first control model is loaded in the cache module. When a model instance of the first control model is not loaded in the cache module, the end node may load the first control model from the model storage module into the cache module. When a model instance of the first control model is already loaded in the cache module, the end node may directly run the first control model.

When running the first application, the end node needs to send a plurality of data streams, and each data stream includes a plurality of data packets. One model instance of the first control model in the cache module may output control parameters used to control sending of all data packets of the first application. In this way, the end node can control sending of the data packets of the plurality of data streams of the first application by using one model instance of the first control model and does not need to obtain one model instance of the first control model for each data stream, thereby simplifying a processing procedure and improving efficiency of obtaining the first control model by the end node.

Step 203: Determine the transmission parameter of the first network based on at least one of a current status parameter of the first network accessed by the end node and a historical status parameter of the first network.

Optionally, the transmission parameter of the first network may include at least one of the following second parameters: an RTT; a time difference, where the time difference is a difference between a current value of the RTT of the first network and a minimum historical value of the RTT; a transmit rate; a receive rate; a packet loss rate; a value of an explicit congestion notification carried in a data packet on the first network; a congestion window value; the RTT obtained after regularization processing; the time difference obtained after regularization processing; the transmit rate obtained after regularization processing; the receive rate obtained after regularization processing; the packet loss rate obtained after regularization processing; the value of the explicit congestion notification carried in the data packet on the first network that is obtained after regularization processing; and the congestion window value obtained after regularization processing.

The RTT, the time difference, the transmit rate, the receive rate, the packet loss rate, the value of the explicit congestion notification carried in the data packet on the first network, and the congestion window value are current status parameters of the first network. The RTT obtained after regularization processing, the time difference obtained after regularization processing, the transmit rate obtained after regularization processing, the receive rate obtained after regularization processing, the packet loss rate obtained after regularization processing, the value of the explicit congestion notification carried in the data packet on the first network that is obtained after regularization processing, and the congestion window value obtained after regularization processing may be obtained by the end node based on the current status parameters and historical status parameters.

The RTT means duration between a moment at which the end node sends a data packet and a moment at which the end node receives an acknowledgement response of the data packet. The transmit rate means a rate at which the end node sends a data packet. The receive rate means a rate at which the end node that receives a data packet receives a data packet from the network. The packet loss rate means a ratio of a quantity of lost data packets to a quantity of all data packets transmitted on the network. The value of the explicit congestion notification carried in the data packet on the network means a value of the explicit congestion notification carried in a data packet currently transmitted by using the network, and the value is used to indicate whether congestion occurs in the network. The congestion window value means a maximum quantity of data packets that the end node can send at a time without receiving any acknowledgement response.

For example, the RTT obtained after regularization processing is represented as $A'=A/B$, where A represents an RTT existing before regularization processing, and B represents a minimum historical value of the RTT. The time difference obtained after regularization processing is represented as $C'=C/B$, where C represents a time difference existing before regularization processing. The transmit rate obtained after regularization processing is represented as $D_1'=D_1/E$, where $D_1$ represents a transmit rate existing before regularization processing, and E represents a maximum historical value of a bandwidth of the network. The receive rate obtained after regularization processing is represented as $D_2'=D_2/B$, where $D_2$ represents a receive rate existing before regularization processing. The congestion window value obtained after regularization processing is represented as $F'=(G \times H)/(B \times E)$, where G represents a congestion window value existing before regularization processing, and H represents a maximum transmission unit (MTU) of the data packet.

In a process in which a control model is obtained through training, when an amount of training data is excessively small or a control model is excessively trained, accuracy of a control parameter output by the control model is relatively low (that is, overfitting occurs in the control model). When the transmission parameter of the first network includes: the RTT obtained after regularization processing; the time difference obtained after regularization processing; the transmit rate obtained after regularization processing; the receive rate obtained after regularization processing; the packet loss rate obtained after regularization processing; the value of the explicit congestion notification carried in the data packet on the network that is obtained after regularization processing; and/or the congestion window value obtained after regularization processing, because overfitting of the first control model can be suppressed by the regularization processing, accuracy of a control parameter subsequently output by the control model can be improved.

Optionally, the transmission parameter of the first network may further include: a change value, corresponding to a target parameter in the at least one second parameter, that is obtained based on the current status parameter of the first network and the historical status parameter of the first network, the change value corresponding to the target parameter is related to a change amount of a current value relative to a historical value of the target parameter, and the target parameter is any parameter in the at least one second parameter. The historical value of the target parameter means a value of the target parameter at a historical moment before a current moment. Optionally, duration between the historical moment and the current moment may be k times an RTT at the current moment. For example, $k \geq 1$. For example, k is 1, 2, 3, 4, 5, or 7. This is not limited in this embodiment of this application. In this way, the transmission parameter of the first network can reflect not only the current status of the first network, but also a historical status of the first network, so that accuracy of subsequently determining the control parameter based on the transmission parameter of the first network is relatively high. It should be noted that the transmission parameter of the first network may include a change value corresponding to at least one target parameter in the at least one second parameter.

For example, when the target parameter is the RTT, the time difference, the transmit rate, or the receive rate in the at least one second parameter, the change value corresponding to the target parameter $\Delta H=(H_1-H_2)/J$. $H_1$ represents the current value of the target parameter, and $H_2$ represents the historical value of the target parameter. When $H_1$ represents the RTT or the time difference, J represents the minimum historical value of the RTT or the historical value of the target parameter (that is, $J=H_2$). When $H_1$ represents the transmit rate or the receive rate, J represents a maximum historical value of the bandwidth of the network or the historical value of the target parameter (that is, $J=H_2$). When the target parameter is the congestion window value, the change value corresponding to the target parameter $\Delta K=[M \times (K_1-K_2)]/L$ or $\Delta K=(K_1-K_2)/K_2$, where $K_1$ represents a current value of a congestion window, $K_2$ represents a historical value of the congestion window, L represents a product of the minimum historical value of the RTT and the maximum historical value of the bandwidth of the network, or L represents the historical value of the congestion window (that is, $L=K_2$), and M represents the MTU of the data packet. When the target parameter is a packet loss rate, the change value corresponding to the target parameter $\Delta N=N_1-N_2$ or $\Delta N=(N_1-N_2)/N_2$, where $N_1$ represents a current value of the packet loss rate, and $N_2$ represents a historical value of the packet loss rate.

Optionally, the developer may preconfigure a plurality of network events for the transmission subsystem. When a network event configured in the transmission subsystem occurs, the event triggers a notification message. The first transmit end may obtain the transmission parameter of the first network based on the notification message. Optionally, the network event may include events for an acknowledgement (ACK) packet, a lost data packet, a transmitted data packet, and the like that are sent by a receive end. The developer may configure the network event for the transmission subsystem by using an interface used to configure the event for the ACK packet, an interface used to configure the event for the lost data packet, and an interface used to configure the event for the transmitted data packet.

Step 204: Process, by using the first control model, the transmission parameter of the first network accessed by the end node, to obtain a first control parameter required for sending the data packet of the first application by the end node by using the first network.

The first control parameter is used to control sending of the data packet of the first application, so that the first network meets the congestion control requirement of the first application. Optionally, the first control parameter may be the congestion window value of the first network, or a value obtained after the congestion window value is calculated, or a rate at which the end node sends the data packet of the first application, or a value obtained after the rate at which the data packet of the first application is sent is calculated. This is not limited in this embodiment. The calculation may include performing an addition operation, a subtraction operation, a multiplication operation, a division operation, or the like with a parameter.

Step 205: Control sending of the data packet of the first application based on the first control parameter.

Optionally, when the first control parameter is the congestion window value of the first network, the end node may adjust, based on the congestion window value, a rate at which the end node sends at least one data packet of the first application. For example, it is assumed that the congestion window value is 8, the end node may send eight data packets, and no ACK packet is received in the process. Each time the end node sends one data packet, the congestion window value is reduced by 1. When the congestion window value is reduced to zero, if the end node has not received an ACK packet, the end node stops sending the data packet. When the first control parameter is the rate at which the end node sends the at least one data packet of the first application, the end node may directly send the at least one data packet of the first application based on the first control parameter. After sending of the data packet of the first application is controlled based on the first control parameter output by the first control model, the end node may further send the at least one data packet of the first application by using the first network.

Optionally, the end node may repeatedly execute a sending control procedure. The sending control procedure includes: processing, by using the first control model, the transmission parameter of the first network accessed by the end node, to obtain the first control parameter required for sending the data packet of the first application by the end node by using the first network and controlling sending of the data packet of the first application based on the first control parameter. For example, the sending control procedure may include the foregoing process of step 203 to step 205.

In the transmission subsystem, because the transmission parameter of the first network may change at different moments, the sending control procedure may be repeatedly executed, to implement real-time control on sending of the data packet of the first application, thereby solving a network congestion problem more effectively. Optionally, after step 205, if the end node sends the at least one data packet of the first application by using the first network, the sending control procedure further includes: sending the at least one data packet of the first application by using the first network.

Optionally, the end node may repeatedly execute the sending control procedure based on a target interval. The target interval may be a function of the RTT at the current moment. For example, the target interval may be at least twice the RTT at the current moment, or the target interval may be a sum of the RTT at the current moment and a parameter. This is not limited in this embodiment. For example, when the target interval is equal to the RTT at the current moment, if the end node receives an acknowledgement response of the at least one data packet by using the first network, the sending control procedure is repeatedly executed.

Optionally, an interface that is used to store a time interval between the current moment and a moment at which the sending control procedure is most recently executed is disposed in the end node. The end node may obtain, by reading the interface, the time interval between the current moment and the moment at which the sending control procedure is most recently executed, to determine whether the time interval is equal to the target interval. If the time interval is equal to the target interval, the end node may repeatedly execute the sending control procedure.

It should be noted that a conventional congestion control algorithm is configured in the transmission subsystem, and the conventional congestion control algorithm may include a Cubic algorithm, a Vegas algorithm, and a BBR (bottleneck bandwidth and RTT) algorithm. In step 202, a case in which the first control model does not exist in the plurality of control models may occur. In this case, the end node may control sending of the data packet of the first application by using the conventional congestion control algorithm configured in the transmission subsystem.

A sequence of the methods provided in the foregoing embodiments may be appropriately adjusted, and steps may also be correspondingly increased or decreased based on a situation. This is not limited in this embodiment.

Optionally, in the foregoing embodiment, an example in which the end node performs the method for controlling data packet sending is used for description. In an example, different steps in the method for controlling data packet sending may be performed by different modules in a protocol stack of the end node. For example, the transmission subsystem may include a model file management module, a model selection module, a network status processing module, and a network congestion processing module. The plurality of control models is stored in the model file management module. Step 201 may be performed by the model file management module, step 202 may be performed by the model selection module, step 203 and step 204 may be performed by the network status processing module, and step 205 may be performed by the network congestion processing module. The different modules may be located in one device or may be located in different devices. When the different modules are located in different devices, the modules can be communicatively connected. The model selection module may select the first control model from the model file management module, and the network status processing module may send a finally obtained transmission parameter of the first network to the network congestion processing module. In this embodiment, a device that performs the method for controlling data packet sending is not limited.

In this embodiment, the end node may first obtain the plurality of control models, and then select the first control model from the plurality of control models based on the first condition. Then, the end node may process, by using the first control model, the transmission parameter of the first network accessed by the end node, to obtain the first control parameter required for sending the data packet of the first application by the end node by using the first network, and control sending of the data packet of the first application based on the first control parameter. Because the first control parameter output by the first control model can control sending of the data packet of the first application, so that the first network meets the congestion control requirement of the first application, a network congestion problem can be effectively resolved.

The foregoing describes the method for controlling data packet sending, and the following describes a training process of a control model.

Figure 4:
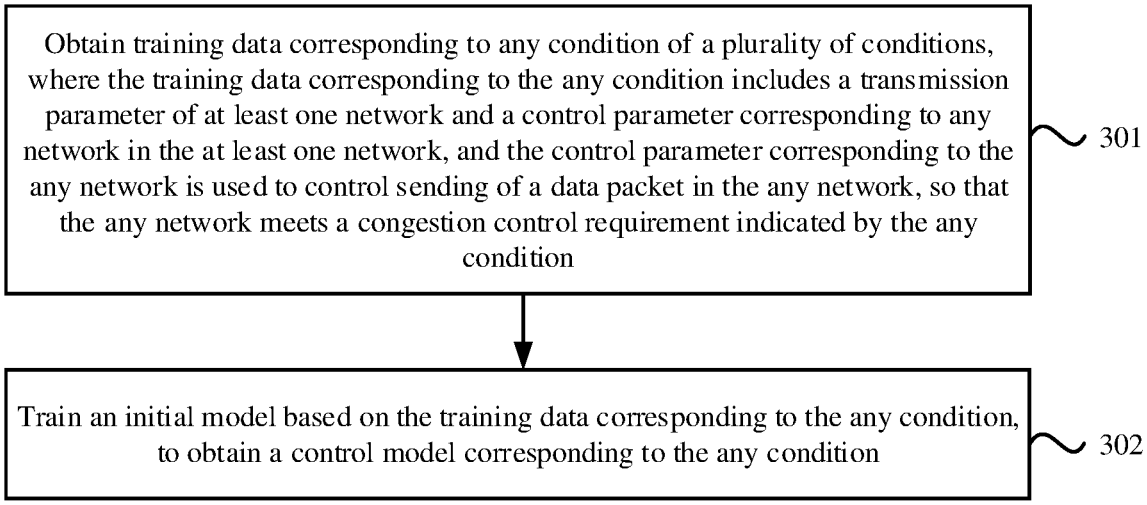
FIG. 4 is a flowchart of a method for training a control model according to an embodiment.

An embodiment provides a model training method, and the method may be applied to a training subsystem (for example, the training subsystem shown in FIG. 1 or FIG. 2). For example, FIG. 4 is a flowchart of a method for training a control model according to an embodiment. The method may include the following steps.

Step 301: Obtain training data corresponding to any condition of a plurality of conditions, where the training data corresponding to the any condition includes a transmission parameter of at least one network and a control parameter corresponding to any network in the at least one network, and the control parameter corresponding to the any network is used to control sending of a data packet in the any network, so that the any network meets a congestion control requirement indicated by the any condition.

At least one parameter of each network in the at least one network has a different value. For both the at least one parameter and the transmission parameter, refer to the foregoing embodiment shown in FIG. 3. Details are not described herein in this embodiment.

Optionally, the transmission parameter of the at least one network may be obtained based on data packet transmission on the at least one network. For example, the training subsystem includes a first node and a simulation device. Before obtaining the training data corresponding to the any condition of the plurality of conditions, the simulation device may forward a data packet sent by the first node by using any network in the at least one network, and then obtain the training data corresponding to the any condition based on transmission of the data packet sent by the first node on the any network. In this case, a transmission parameter of the any network may be a transmission parameter of the any network that is recorded in the first node. Optionally, the training subsystem may alternatively control the first node to send a data packet by using at least one network.

When the any condition is used to indicate a congestion control requirement of an application, the control parameter included in the training data corresponding to the any condition is used to control data packet sending on the at least one network, so that the at least one network meets the congestion control requirement of the application. The control parameter may be a congestion window value or a loss function value. Optionally, the any condition may be further used to indicate an environment of the at least one network. For both the congestion control requirement and the environment of the network, refer to the foregoing embodiment shown in FIG. 3. Details are not described herein in this embodiment.

When the any condition is used to indicate the congestion control requirement of the application and the environment of the at least one network, in an example, any training sample may be obtained based on a transmission status of data packets on a plurality of networks that meet the environment of the at least one network. In another example, a value of at least one of the following parameters of a same simulation network may be changed when the environment of the at least one network is met: a maximum bandwidth, a minimum round-trip time, a random packet loss rate, and a size of a buffer, and the any training sample is obtained based on the transmission status of the data packet on the at least one network with different network environments.

Corresponding to the foregoing another example, as described above, it is assumed that the following parameters of each network in the at least one network have different values: the maximum bandwidth, the minimum RTT, the random packet loss rate, and the size of the buffer. A value range of the maximum bandwidth, the minimum RTT, the random packet loss rate, and the size of the buffer of the at least one network may be "10 Mbps≤the maximum bandwidth≤200 Mbps, 50 ms≤the minimum RTT≤200 ms, 0%≤the random packet loss rate≤1%, and 0.1×BDP≤the size of the buffer≤2×BDP". The training subsystem may successively set the maximum bandwidth of the simulation network to values discretely distributed in 10 Mbps to 200 Mbps, where every two adjacent values may differ by 10; may successively set the minimum RTT to values discretely distributed in 50 ms to 200 ms, where every two adjacent values may differ by 10; and may successively set the packet loss rate to values discretely distributed in 0% to less than or equal to 1%, where a difference between every two adjacent values is 0.1%. This is not limited in this embodiment.

The control parameter included in the training data corresponding to the any condition may be determined by a training subsystem in a manner preconfigured by the developer. For example, the developer may configure a calculation formula of the control parameter based on the congestion control requirement indicated by the any condition. For example, it is assumed that the congestion control requirement indicated by the any condition is high bandwidth utilization and a stable time difference, and the developer may configure a calculation formula of the control parameter as: Control parameter=Available bandwidth of a simulation link×RTT of the simulation link. For another example, it is assumed that the congestion control requirement indicated by the any condition is high bandwidth utilization, a stable time difference, and a fast preemption buffer, and the developer may configure the calculation formula of the control parameter as: Control parameter=Available bandwidth of the simulation link×RTT of the simulation link+Size of the buffer.

Further, if a value of at least one of the following parameters of a same simulation network is changed when the environment of the at least one network is met: the maximum bandwidth, the minimum round-trip time, the random packet loss rate, and the size of the buffer, and the training data corresponding to the any condition is obtained based on transmission of data packets on the at least one network with different network environments, the training subsystem may obtain, when determining the control parameter by using a control parameter-based calculation formula, a calculation parameter required in the calculation formula that is recorded in the simulation device. For example, the calculation parameter required in the calculation formula may generally include one or more of the following: the available bandwidth, the RTT, the minimum RTT, the transmit rate, the receive rate, the random packet loss rate, the size of the buffer, and the like. This is not limited in this embodiment. It should be noted that, because all sending nodes (nodes configured to send data packets, such as the foregoing first node) in the training subsystem need to send data packets by using the simulation device, the calculation parameter recorded in the simulation device is relatively accurate. The control parameter is determined based on the calculation parameter obtained from the simulation device. This can ensure accuracy of the control parameter.

It should be noted that the foregoing moment at which the calculation parameter is obtained from the simulation device needs to be consistent with the moment at which the transmission parameter of the at least one network is obtained from the first node. In this way, it can be ensured that a moment corresponding to the calculated control parameter is consistent with a moment corresponding to the transmission parameter of the at least one network, thereby ensuring accuracy of training data.

Further, optionally, before the training data corresponding to the any condition is obtained, the simulation device may further forward the data packet sent by the second node by using the network in which the first node sends the data packet. Optionally, the training subsystem may alternatively control the second node to send a data packet by using the network in which the first node sends the data packet. For example, the training subsystem may control the second node to send the data packet at a rate in a target sending mode by using the network in which the first node sends the data packet. For example, the target sending mode may be a sending mode of a to-be-controlled data packet, for example, may be a target sending mode of a rate of a data packet of the first application in the embodiment shown in FIG. 3.

It should be noted that, the training subsystem may alternatively control the second node to send the data packet at a rate in another sending mode by using the network in which the first node sends the data packet. For example, the rate in the another sending mode may be further as follows: A rate of sending a data packet exponentially increases, a rate of sending a data packet exponentially decreases, a rate of sending a data packet linearly increases, a rate of sending a data packet linearly decreases, or a rate of sending a data packet is a random rate. This is not limited in this embodiment.

Optionally, the data packet sent by the second node may be a data packet transmitted by using a user datagram protocol (UDP).

Step 302: Train an initial model based on the training data corresponding to the any condition, to obtain a control model corresponding to the any condition.

The control model is used to process a transmission parameter of any network in the at least one network to obtain a control parameter required for sending a data packet by using the any network, and the control parameter is used to control data packet sending on the any network.

Optionally, the training subsystem prestores the initial model. The training subsystem may train the initial model by using a supervised machine learning algorithm or an unsupervised machine learning algorithm. For example, the supervised machine learning algorithm may include an artificial neural network, a decision tree, a support vector machine, a random forest, a Bayesian network, and a genetic algorithm. The unsupervised machine learning algorithm may include a clustering algorithm. In each training process, the training subsystem may optimize a model parameter of the initial model based on any training data. For example, the training subsystem may use an Adam (a method for stochastic optimization) optimizer to optimize the model parameter of the initial model.

In a process of training the initial model in step 302, a loss value threshold may be set and a loss value of the trained initial model may be detected, and the loss value can represent a difference between a parameter output by the trained initial model and a control parameter. When the loss value is greater than or equal to the loss value threshold, it indicates that accuracy of the initial model is relatively low. In this case, training may be continued on the initial model. When the loss value is less than the loss value threshold, it indicates that the accuracy of the initial model is relatively high. In this case, a process of training the initial model ends, to obtain the control model corresponding to the any condition.

It should be noted that in the foregoing embodiment, that the initial model is trained by using the training data corresponding to the any condition to obtain the control model corresponding to the any condition is used as an example for description. In an actual training process, training data corresponding to the plurality of conditions may be used to train the initial model, to obtain a plurality of control models corresponding to the plurality of conditions. For the process, refer to step 301 and step 302. Details are not described herein in this embodiment.

A sequence of the methods provided in the foregoing embodiments may be appropriately adjusted, and steps may also be correspondingly increased or decreased based on a situation. In this embodiment, different steps in the method for training a control model may be performed by different modules in an offline training subsystem. For example, the training subsystem may include a data collection module, a forwarding module, and a training module. Step 301 may be performed by the data collection module, step 302 may be performed by the training module, and a process of forwarding the data packet of the first node and the data packet of the second node may be performed by the forwarding module. In this case, the data collection module needs to send the training data corresponding to the any condition to the training module. Refer to FIG. 2. The data collection module and the forwarding module may belong to modules in the simulation device 1011, and the training module belongs to a module in the training server 1012. Alternatively, the forwarding module belongs to a module in the simulation device 1011, and the data collection module and the training module belong to modules in the training server 1012. Alternatively, the three modules may be located in different devices. A device that performs the model training method is not limited in this embodiment.

A training subsystem in a related technology is usually an offline training subsystem. When a control model is trained, the training subsystem includes only one sending node. A training server trains an initial model based on a transmission parameter of at least one network when the sending node transmits a data packet by using the at least one network. However, data packets sent by a plurality of sending nodes are usually transmitted in a real network. Therefore, the transmission parameter of the at least one network is usually different from a transmission parameter of the real network, and consequently, the trained control model cannot be applied to control of data packet sending in the real network. In addition, when a fluctuation of the real network is relatively large, robustness of the control model is relatively poor, and consequently, the control model cannot effectively resolve a network congestion problem.

However, in this embodiment, when the offline training subsystem includes a plurality of sending nodes, the at least one network transmits data packets sent by the plurality of sending nodes, and the sending nodes may send data packets based on a mode of a rate at which the data packet of the first application is transmitted in the first network. In this way, a difference between the transmission parameter of the at least one network and the transmission parameter of the real network is relatively small, so that applicability of the trained control model in the real network is improved, robustness of the control model in the real network with a relatively large fluctuation is relatively good, and a network congestion problem can be effectively resolved.

The related technology further provides a technology for controlling data packet sending based on an online learning algorithm. A transmission subsystem in the related technology includes an end node. A sending controlling manner is preconfigured in the end node. The end node periodically determines current performance indicator information of the network by using a sending moment of a data packet, a size of the data packet, a receiving moment of an ACK packet, a packet loss rate, and the like, updates the sending controlling manner based on the performance indicator information, and then controls data packet sending based on the updated sending controlling manner.

However, in a process of updating the sending controlling manner, the current performance indicator information of the network needs to be determined by using the sending moment of the data packet, the size of the data packet, the receiving moment of the ACK packet, the packet loss rate, and the like. Therefore, the performance indicator information may not be determined within a period of time after the end node starts to send the data packet, and consequently, the sending controlling manner cannot be updated within the period of time after the end node starts to send the data packet. In addition, for a data packet whose transmission time is relatively short, a case in which performance indicator information cannot be collected may occur, and consequently, a sending controlling manner cannot be updated. In addition, when a fluctuation in the network is relatively large, a difference in performance indicator information collected at different moments is relatively large, and consequently, accuracy of the performance indicator information is relatively low. As a result, accuracy of a sending controlling manner obtained through training in the network with a relatively large fluctuation is relatively low.

However, in this embodiment, the control model may be obtained through training by using the offline training subsystem and is then applied to an online transmission subsystem. Therefore, when the end node starts to send a data packet, the control model is a control model obtained through training. This avoids a case in which the control model cannot be trained within a period of time after the end node starts to send a data packet, and a case in which the control model cannot be trained for a data packet whose transmission time is relatively short. In addition, accuracy of the control model is not affected by the online transmission subsystem, thereby ensuring the accuracy of the control model.

For example, this embodiment compares this embodiment with the related technology in an experimental environment in which two virtual machines perform data transmission in a cloud scenario. The two virtual machines are located in different areas, a maximum bandwidth of a link between the two virtual machines is 1000 Mbps, and a minimum RTT is 50 ms. A comparison result is shown in the following Table 2. In the related technology, after a sending status of a data packet is controlled by using a BBR algorithm, an average throughput is 485.78 Mbps, a $95^{th}$-quantile time difference is 161.11 ms, and the packet loss rate is 1.06%. Although the average throughput is relatively large, the time difference and the packet loss rate are relatively large. After the sending status of the data packet is controlled by using a Cubic algorithm, the average throughput is 453.39 Mbps, the $95^{th}$-quantile time difference is 82.59 ms, and the packet loss rate is 0.46%. Although both the time difference and the packet loss rate are relatively small, the average throughput is relatively small. After the sending status of the data packet is controlled by using a Vegas algorithm, the average throughput is 337.02 Mbps, the $95^{th}$-quantile time difference is 68.41 ms, and the packet loss rate is 0.39%. Although both the time difference and the packet loss rate are relatively small, the average throughput is relatively small. After the sending status of the data packet is controlled by using a low extra delay background transport (LEDBAT) algorithm, the average throughput is 25.45 Mbps, the $95^{th}$-quantile time difference is 59.29 ms, and the packet loss rate is 0.54%. Although both the time difference and the packet loss rate are relatively small, the average throughput is relatively small.

However, in the method for controlling data packet sending provided in this embodiment, after a control model corresponding to a transmission condition that is a high throughput is used to control the sending status of the data packet, the average throughput is 609.82 Mbps, the $95^{th}$-quantile time difference is 125.23 ms, and the packet loss rate is 0.67%. After a control model corresponding to a transmission condition that is a low time difference is used to control the sending status of the data packet, the average throughput is 558.57 Mbps, the $95^{th}$-quantile time difference is 81.46 ms, and the packet loss rate is 0.56%. It can be understood that, in the two control models provided in this embodiment, a time difference is relatively small while a high throughput is met, a throughput is relatively large when a low time difference is met, and a packet loss rate is relatively small in cases of the two models. The average throughput can reflect an occupation status of a bandwidth of a link. A higher average throughput indicates higher utilization of the bandwidth of the network. The $95^{th}$-quantile time difference means the $95^{th}$ time difference in 100 collected time differences. It can be understood that, in comparison with the related technology, in this embodiment, the time difference and the packet loss rate can be reduced while the throughput is increased, thereby improving data packet transmission efficiency, and more effectively resolving a network congestion problem.

TABLE 2

| Sending controlling manner of a data packet | Average throughput (Mbps) | $95^{th}$-quantile time difference (ms) | Packet loss rate (%) |
| --- | --- | --- | --- |
| BBR | 485.78 | 161.11 | 1.06 |
| Cubic | 453.39 | 82.59 | 0.46 |
| Vegas | 337.02 | 68.41 | 0.39 |
| LEDBAT | 25.45 | 59.29 | 0.54 |
| This application (high throughput) | 609.82 | 125.23 | 0.67 |
| This application (low time difference) | 558.57 | 81.46 | 0.56 |

In conclusion, in this embodiment, the end node may first obtain the plurality of control models, and then select the first control model from the plurality of control models based on the first condition used to indicate the congestion control requirement of the first application. Then, the end node may process, by using the first control model, the transmission parameter of the first network accessed by the end node, to obtain the first control parameter required for sending the data packet of the first application by the end node by using the first network, and control sending of the data packet of the first application based on the first control parameter. Because the first control parameter output by the first control model can control sending of the data packet of the first application, so that the first network meets the congestion control requirement of the first application, impact of network congestion can be better alleviated, which also has a specific effect on preventing network congestion.

A sequence of the methods provided in the embodiments may be appropriately adjusted, and steps may also be correspondingly increased or decreased based on a situation. Any variation method readily figured out by a person skilled in the art shall fall within the protection scope. Therefore, details are not described herein.

With reference to FIG. 1 to FIG. 4, the foregoing describes in detail the method for controlling data packet sending and the model training method that are provided in the embodiments. With reference to FIG. 5 to FIG. 8, the following describes an apparatus for controlling data packet sending and a model training apparatus that are provided in the embodiments.

Figure 5:
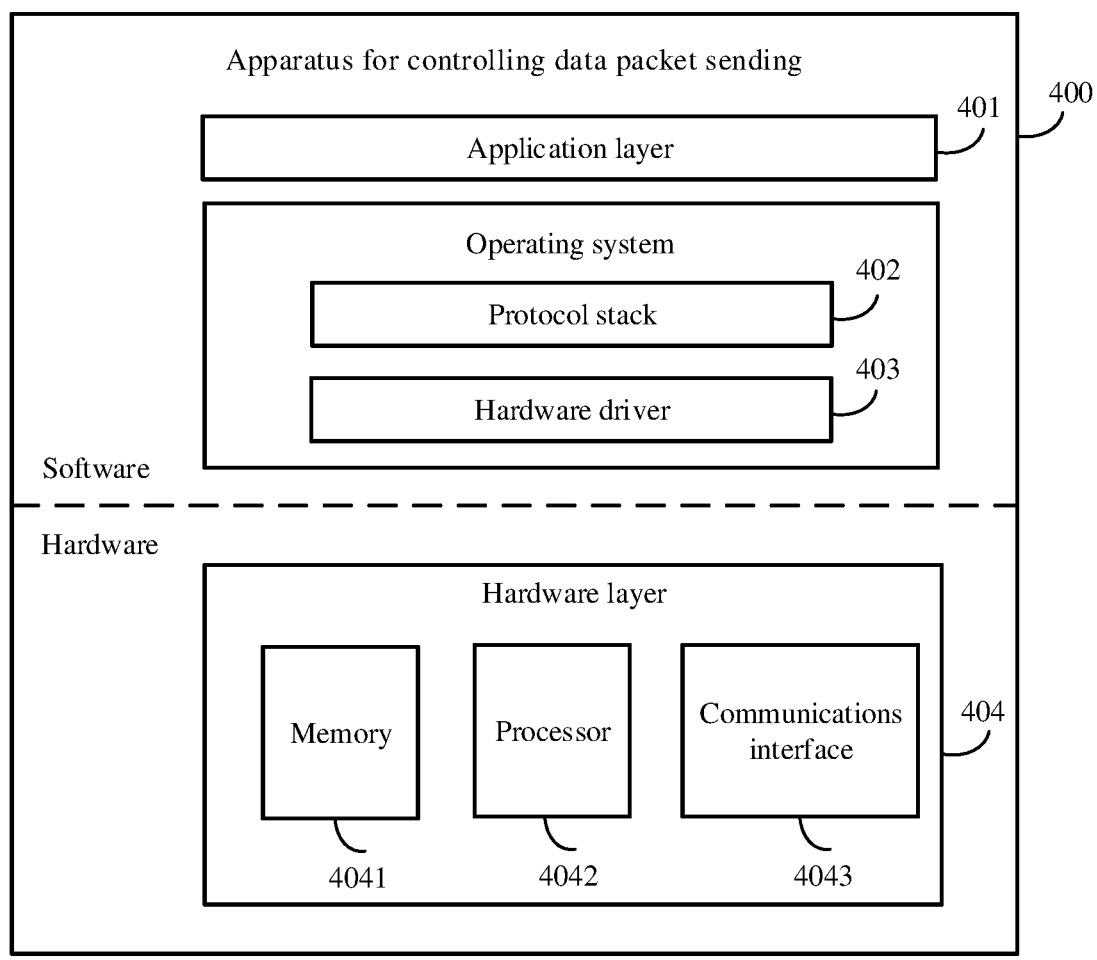
FIG. 5 is a block diagram of an apparatus for controlling data packet sending according to an embodiment.

An embodiment provides an apparatus for controlling data packet sending, and the apparatus may be applied to an end node. For example, FIG. 5 is a block diagram of an apparatus for controlling data packet sending according to an embodiment. The apparatus 400 for controlling data packet sending includes an application layer 401 and a protocol stack 402. The apparatus 400 for controlling data packet sending may further include a hardware driver 403 and a hardware layer 404. The application layer 401, the protocol stack 402, and the hardware driver 403 are all software, and the hardware layer 404 is hardware. Both the protocol stack 402 and the hardware driver 403 may be located in an operating system of the end node. The application layer 401 includes a first application. The hardware layer 404 may include a memory 4041, a processor 4042, and a communications interface 4043. For example, the communications interface 4043 may be a communications interface such as a network adapter used for network interconnection. The protocol stack 402 may support a transmission control protocol (TCP), an internet protocol (IP), and the like. In the apparatus 400 for controlling data packet sending, the protocol stack 402 is configured to:

obtain a plurality of control models, where the plurality of control models corresponds to a plurality of conditions;

select, based on a first condition, a first control model corresponding to the first condition from the plurality of control models, where the first condition is used to indicate a congestion control requirement of the first application, the first control model is used to process a transmission parameter of any network in at least one network, to obtain a control parameter required for sending a data packet of the first application by using the any network, the control parameter is used to control sending of the data packet of the first application, so that the any network meets the congestion control requirement of the first application, and the control parameter includes at least one of a congestion window and a transmit rate;

process, by using the first control model, a transmission parameter of a first network accessed by the end node, to obtain a first control parameter required for sending the data packet of the first application by the end node by using the first network; and control sending of the data packet of the first application based on the first control parameter.

Optionally, the first condition is further used to indicate an environment of the at least one network, and each network in the at least one network has a different environment.

Optionally, a part, of the first condition, that is used to indicate the environment of the at least one network includes a range of at least one of the following first parameters: a maximum bandwidth, a minimum round-trip time, a random packet loss rate, or a size of a buffer, and the buffer includes storage space that is in a routing/switching device in the network and that is used to cache a data packet sent by the end node.

Optionally, the protocol stack is further configured to:

determine the transmission parameter of the first network based on at least one of a current status parameter of the first network and a historical status parameter of the first network.

Optionally, the transmission parameter includes at least one of the following second parameters:

a round-trip time;

a time difference, where the time difference is a difference between a current value of the round-trip time and a minimum historical value of the round-trip time;

a transmit rate;

a receive rate;

a packet loss rate;

a value of an explicit congestion notification carried in a data packet on the network;

a congestion window value;

the round-trip time obtained after regularization processing;

the time difference obtained after regularization processing;

the transmit rate obtained after regularization processing;

the receive rate obtained after regularization processing;
the packet loss rate obtained after regularization processing;
the value of the explicit congestion notification carried in the data packet on the network that is obtained after regularization processing; and
the congestion window value obtained after regularization processing.

Optionally, the transmission parameter further includes: a change value corresponding to a target parameter in the at least one second parameter, the change value corresponding to the target parameter is related to a change amount of a current value relative to a historical value of the target parameter, and the target parameter is any parameter in the at least one second parameter.

Optionally, the condition includes an identifier of the control model corresponding to the condition.

Optionally, the protocol stack 402 is further configured to:
repeatedly execute a sending control procedure; and
the sending control procedure includes: processing, by using the first control model, the transmission parameter of the first network accessed by the end node, to obtain the first control parameter required for sending the data packet of the first application by the end node by using the first network and controlling sending of the data packet of the first application based on the first control parameter.

Optionally, the protocol stack 402 is further configured to:
after the controlling sending of the data packet of the first application based on the first control parameter, sending at least one data packet of the first application by using the first network, where the sending control procedure further includes:
sending the at least one data packet by using the first network; and
the repeatedly executing a sending control procedure includes:
if an acknowledgement ACK packet of the at least one data packet is received by using the first network, repeatedly executing the sending control procedure.

Optionally, the protocol stack 402 is further configured to:
obtain training data corresponding to any condition of the plurality of conditions, where the training data corresponding to the any condition includes a transmission parameter of the at least one network and a control parameter corresponding to any network in the at least one network, and the control parameter corresponding to the any network is used to control sending of a data packet in the any network, so that the any network meets a congestion control requirement indicated by the any condition; and
train an initial model based on the training data corresponding to the any condition, to obtain a control model corresponding to the any condition.

Optionally, the protocol stack 402 is further configured to:
forward a data packet sent by a first node by using the any network;
forward a data packet sent by a second node by using the any network; and
obtain the training data corresponding to the any condition based on transmission, on the any network, of the forwarded data packet sent by the first node and the forwarded data packet sent by the second node.

Figure 6:
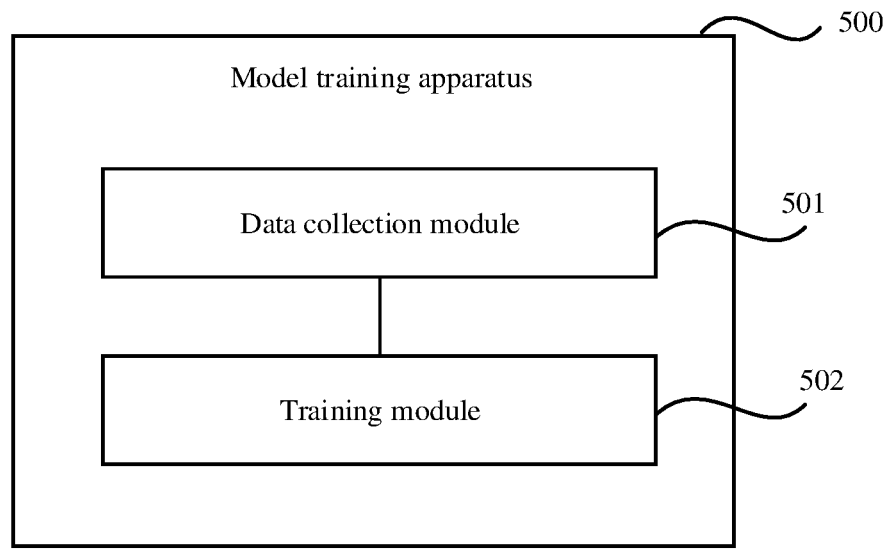
FIG. 6 is a block diagram of a model training apparatus according to an embodiment.

An embodiment provides a model training apparatus 500. FIG. 6 is a block diagram of the model training apparatus according to this embodiment, and the model training apparatus 500 includes:

a data collection module 501, configured to obtain training data corresponding to any condition of a plurality of conditions, where the training data corresponding to the any condition includes a transmission parameter of at least one network and a control parameter corresponding to any network in the at least one network, the any condition is used to indicate a congestion control requirement of an application, the control parameter corresponding to the any network is used to control sending of a data packet in the any network, so that the any network meets the congestion control requirement indicated by the any condition, and the control parameter includes at least one of a congestion window and a transmit rate; and a training module 502, configured to train an initial model based on the training data corresponding to the any condition, to obtain a control model corresponding to the any condition, where the control model corresponding to the any condition is used to process a transmission parameter of the any network in the at least one network, to obtain the control parameter corresponding to the any network.

Figure 7:
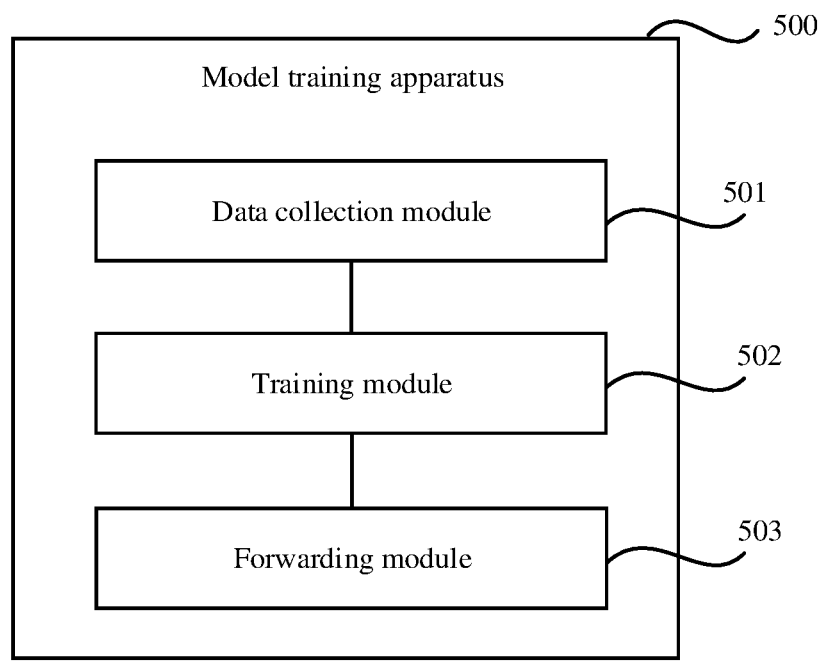
FIG. 7 is a block diagram of another model training apparatus according to an embodiment.

Optionally, FIG. 7 is a block diagram of another model training apparatus according to an embodiment. On the basis of FIG. 6, the model training apparatus 500 further includes a forwarding module 503, and the forwarding module 503 is configured to:
forward a data packet sent by a first node by using the any network; and
forward a data packet sent by a second node by using the any network; and
correspondingly, the data collection module 501 is configured to:
obtain the training data corresponding to the any condition based on transmission, on the any network, of the forwarded data packet sent by the first node and the forwarded data packet sent by the second node.

Optionally, each network in the at least one network has a different environment.

Optionally, each network in the at least one network has a different value for at least one of the following parameters: a maximum bandwidth, a minimum round-trip time, a random packet loss rate, and a size of a buffer, and the buffer includes storage space that is in a routing/switching device in the network and that is used to cache a data packet sent by the end node.

Optionally, the transmission parameter includes at least one of the following second parameters:
a round-trip time;
a time difference, where the time difference is a difference between a current value of
the round-trip time and a minimum historical value of the round-trip time;
a transmit rate;
a receive rate;
a packet loss rate;
a value of an explicit congestion notification carried in a data packet on the network;
a congestion window value;
the round-trip time obtained after regularization processing;
the time difference obtained after regularization processing;
the transmit rate obtained after regularization processing;
the receive rate obtained after regularization processing;
the packet loss rate obtained after regularization processing;

the value of the explicit congestion notification carried in the data packet on the network that is obtained after regularization processing; and the congestion window value obtained after regularization processing.

Optionally, the transmission parameter further includes: a change value corresponding to a target parameter in the at least one second parameter, the change value corresponding to the target parameter is related to a change amount of a current value relative to a historical value of the target parameter, and the target parameter is any parameter in the at least one second parameter.

An embodiment provides a computer-readable storage medium. The storage medium stores a computer program, and the computer program is executed by a processor to implement any method for controlling data packet sending provided in the embodiments or implement any model training method provided in the embodiments.

An embodiment of this application provides a chip. The chip includes a programmable logic circuit and/or program instructions. The chip runs to implement any method for controlling data packet sending provided in the embodiments or implement any model training method provided in the embodiments.

An embodiment provides a computer program product that includes instructions. When the computer program product runs on a computer, the computer is enabled to perform any method for controlling data packet sending provided in the embodiments or perform any model training method provided in the embodiments.

All or a part of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedures or the functions according to the embodiments are all or partially generated. The computer may be a general purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

An embodiment provides an apparatus for controlling data packet sending. The apparatus for controlling data packet sending includes a memory and a processor. The processor is configured to execute a program stored in the memory, to implement any method for controlling data packet sending provided in the embodiments.

Figure 8:
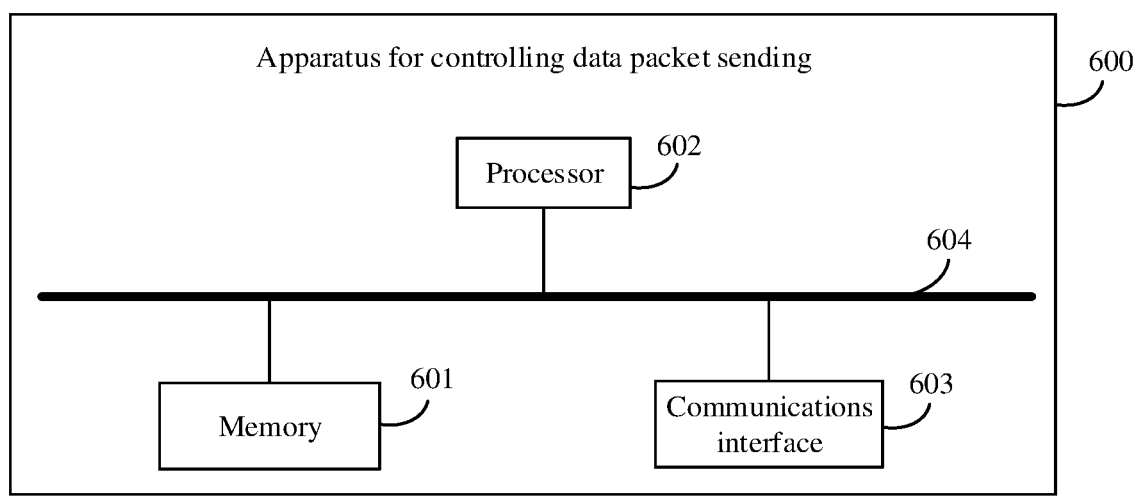
FIG. 8 is a schematic diagram of a structure of an apparatus for controlling data packet sending according to an embodiment.

For example, FIG. 8 is a schematic diagram of a structure of an apparatus 600 for controlling data packet sending according to an embodiment. As shown in FIG. 8, the apparatus 600 for controlling data packet sending includes a memory 601 and a processor 602. The memory 601 is configured to store a program, and the processor 602 is configured to execute the program stored in the memory 601, to implement any method for controlling data packet sending provided in the embodiments.

Optionally, as shown in FIG. 8, the apparatus 600 for controlling data packet sending may further include at least one communications interface 603 and at least one communications bus 604. The memory 601, the processor 602, and the communications interface 603 are communicatively connected by using the communications bus 604. The communications interface 603 is configured to communicate with another apparatus under control of the processor 602, and the processor 602 may invoke, by using the communications bus 604, the program stored in the memory 601.

An embodiment provides a model training apparatus. The model training apparatus includes a memory and a processor. The processor is configured to execute a program stored in the memory, to implement any model training method provided in the embodiments. For a structure of the model training apparatus, refer to the structure of the apparatus 600 for controlling data packet sending shown in FIG. 8. Details are not described herein.

The terms "first", "second", and the like are merely intended for description, and shall not be understood as an indication or implication of relative importance. The term "at least one" means one or more, and the term "a plurality of" means two or more, unless expressly limited otherwise. The term "and/or" describes only an association relationship for describing associated objects and represents that three relationships may exist. For example, A and/or B may represent the following three cases: only A exists, both A and B exist, and only B exists. In addition, the character "/" usually indicates an "or" relationship between the associated objects.

It should be noted that the method embodiments and the apparatus embodiments provided may be referenced to each other. This is not limited in the embodiments. A sequence of the steps of the method embodiments provided in the embodiments can be properly adjusted, and the steps can be correspondingly added or deleted based on a situation. Any method that can be easily figured out by a person skilled in the art without departing from a scope shall fall within the scope of the embodiments.

The foregoing description merely provides embodiments, but they are not intended as limiting. Any equivalent modification or replacement readily figured out by a person skilled in the art shall fall within the scope of the embodiments.

What is claimed is:

1. A method for controlling data packet sending, wherein the method is applied to an end node, the end node runs a first application, and the method comprises:
   obtaining a plurality of control models, wherein the plurality of control models corresponds to a plurality of conditions;
   obtaining training data corresponding to any condition of the plurality of conditions;
   training an initial model with the obtained training data, wherein training continues until a loss value is less than a loss value threshold;
   after the loss value is less than the loss value threshold, setting a first trained model as a first control model of the plurality of control models for a first condition;
   selecting, based on the first condition, the first control model corresponding to the first condition from the plurality of control models, wherein the first condition is used to indicate a congestion control requirement of the first application, the first control model is used to process a transmission parameter of any network in at least one network, to obtain a control parameter required for sending a data packet of the first application by using the any network, the at least one network comprises a first network accessed by the end node, the control parameter is used to control sending of the data packet of the first application, so that the any network meets the congestion control requirement of the first application, and the control parameter comprises at least one of a congestion window value or a transmit rate;

processing, by using the first control model, a transmission parameter of the first network accessed by the end node, to obtain a first control parameter required for sending the data packet of the first application by the end node by using the first network; and controlling sending of the data packet of the first application based on the first control parameter.

2. The method according to claim 1, wherein the first condition is further used to indicate an environment of the at least one network, and each network in the at least one network has a different environment.

3. The method according to claim 2, wherein a part of the first condition that is used to indicate the environment of the at least one network comprises a range of at least one of the following first parameters:

a maximum bandwidth,
a minimum round-trip time,
a random packet loss rate, or
a size of a buffer, and the buffer comprises storage space that is in a routing/switching device in the network and that is used to cache a data packet sent by the end node.

4. The method according to claim 1, wherein, before processing, by using the first control model, the transmission parameter of the first network accessed by the end node, to obtain a first control parameter required for sending the data packet of the first application by the end node by using the first network, the method further comprises:

determining the transmission parameter of the first network based on at least one of a current status parameter of the first network and a historical status parameter of the first network.

5. The method according to claim 4, wherein the transmission parameter comprises at least one of the following second parameters:

a round-trip time;
a time difference, wherein the time difference is a difference between a current value of the round-trip time and a minimum historical value of the round-trip time;
the transmit rate;
a receive rate;
a packet loss rate;
a value of an explicit congestion notification carried in a data packet on the network;
a congestion window value;
the round-trip time obtained after regularization processing;
the time difference obtained after regularization processing;
the transmit rate obtained after regularization processing;
the receive rate obtained after regularization processing;
the packet loss rate obtained after regularization processing;
the value of the explicit congestion notification carried in the data packet on the network that is obtained after regularization processing; and
the congestion window value obtained after regularization processing.

6. The method according to claim 5, wherein the transmission parameter further comprises:

a change value corresponding to a target parameter in the at least one second parameter, the change value corresponding to the target parameter is related to a change amount of a current value relative to a historical value of the target parameter, and the target parameter is any parameter in the at least one second parameter.

7. The method according to claim 1, wherein the first condition comprises an identifier of the control model corresponding to the first condition.

8. The method according to claim 1, wherein after controlling the sending of the data packet of the first application based on the first control parameter, the method further comprises:

repeatedly executing a sending control procedure; and sending the control procedure further comprises:

processing, by using the first control model, the transmission parameter of the first network accessed by the end node, to obtain the first control parameter required for sending the data packet of the first application by the end node by using the first network, and controlling the sending of the data packet of the first application based on the first control parameter.

9. The method according to claim 8, further comprising:

after controlling the sending of the data packet of the first application based on the first control parameter, sending at least one data packet of the first application by using the first network, wherein sending the control procedure further comprises:

sending the at least one data packet by using the first network; and repeatedly executing the sending control procedure further comprises:

after an acknowledgement ACK packet of the at least one data packet is received by using the first network, repeatedly executing the sending control procedure.

10. The method according to claim 1, wherein the training data corresponding to the first condition comprises:

a transmission parameter of the at least one network and a control parameter corresponding to any network in the at least one network, and used to control sending of a data packet in the any network, so that the any network meets a congestion control requirement indicated by the first condition after selecting the first control model from the plurality of control models based on the first condition used to indicate the congestion control requirement of the first application.

11. The method according to claim 10, wherein, before obtaining the training data corresponding to any condition of the plurality of conditions, the method further comprises:

forwarding a data packet sent by a first node by using the any network; and forwarding a data packet sent by a second node by using the any network; and obtaining the training data corresponding to any condition of the plurality of conditions further comprises:

obtaining the training data corresponding to the any condition based on transmission, on the any network, of the forwarded data packet sent by the first node and the forwarded data packet sent by the second node.

12. An apparatus for controlling data packet sending, comprising:

a memory and a processor, wherein the memory is coupled to the processor; and the memory stores program instructions, and when the program instructions are run by the processor, the processor is configured to:

obtain a plurality of control models, wherein the plurality of control models corresponds to a plurality of conditions;

obtain training data corresponding to any condition of the plurality of conditions;

training an initial model with the obtained training data, wherein training continues until a loss value is less than a loss value threshold;

after the loss value is less than the loss value threshold, setting a first trained model as a first control model of the plurality of control models for a first condition;

select, based on the first condition, the first control model corresponding to the first condition from the plurality of control models, wherein the first condition is used to indicate a congestion control requirement of a first application, the first control model is used to process a transmission parameter of any network in at least one network, to obtain a control parameter required for sending a data packet of the first application by using the any network, the at least one network comprises a first network accessed by the apparatus, the control parameter is used to control sending of the data packet of the first application, so that the any network meets the congestion control requirement of the first application, and the control parameter comprises at least one of a congestion window value or a transmit rate;

process, by using the first control model, a transmission parameter of the first network accessed by the apparatus, to obtain a first control parameter required for sending the data packet of the first application by the apparatus by using the first network; and control sending of the data packet of the first application based on the first control parameter.

13. The apparatus according to claim 12, wherein the first condition is further used to indicate an environment of the at least one network, and each network in the at least one network has a different environment.

14. The apparatus according to claim 13, wherein a part of the first condition that is used to indicate the environment of the at least one network comprises a range of at least one of the following first parameters:
a maximum bandwidth,
a minimum round-trip time,
a random packet loss rate, or
a size of a buffer, and the buffer comprises storage space that is in a routing/switching device in the network and that is used to cache a data packet sent by the apparatus.

15. The apparatus according to claim 12, wherein before the processing, by using the first control model, the transmission parameter of the first network accessed by the apparatus, to obtain a first control parameter required for sending the data packet of the first application by the apparatus by using the first network, the processor is further configured to:

determine the transmission parameter of the first network based on at least one of a current status parameter of the first network and a historical status parameter of the first network.

16. The apparatus according to claim 15, wherein the transmission parameter comprises at least one of the following second parameters:

a round-trip time;
a time difference, wherein the time difference is a difference between a current value of the round-trip time and a minimum historical value of the round-trip time;
the transmit rate;
a receive rate;
a packet loss rate;
a value of an explicit congestion notification carried in a data packet on the network;
a congestion window value;
the round-trip time obtained after regularization processing;
the time difference obtained after regularization processing;
the transmit rate obtained after regularization processing;
the receive rate obtained after regularization processing;
the packet loss rate obtained after regularization processing;
the value of the explicit congestion notification carried in the data packet on the network that is obtained after regularization processing; and
the congestion window value obtained after regularization processing.

17. A non-transitory computer-readable storage medium, storing one or more instructions that, when the medium is in an apparatus for controlling data packet sending, executed by at least one processor, cause the at least one processor to:

obtain a plurality of control models, wherein the plurality of control models corresponds to a plurality of conditions;

obtain training data corresponding to any condition of the plurality of conditions;

training an initial model with the obtained training data, wherein training continues until a loss value is less than a loss value threshold;

after the loss value is less than the loss value threshold, setting a first trained model as a first control model of the plurality of control models for a first condition;

select, based on the first condition, the first control model corresponding to the first condition from the plurality of control models, wherein the first condition is used to indicate a congestion control requirement of a first application, the first control model is used to process a transmission parameter of any network in at least one network, to obtain a control parameter required for sending a data packet of the first application by using the any network, the at least one network comprises a first network accessed by the end node, the control parameter is used to control sending of the data packet of the first application, so that the any network meets the congestion control requirement of the first application, and the control parameter comprises at least one of a congestion window value or a transmit rate;

process, by using the first control model, a transmission parameter of the first network accessed by an end node, to obtain a first control parameter required for sending the data packet of the first application by the end node by using the first network; and control sending of the data packet of the first application based on the first control parameter.

18. The non-transitory computer-readable storage medium according to claim 17, wherein the first condition is further used to indicate an environment of the at least one network, and each network in the at least one network has a different environment.

19. The non-transitory computer-readable storage medium according to claim 18, wherein a part, of the first condition, that is used to indicate the environment of the at least one network comprises a range of at least one of the following first parameters: a maximum bandwidth, a minimum round-trip time, a random packet loss rate, or a size of a buffer, and the buffer comprises storage space that is in a routing/switching device in the network and that is used to cache a data packet sent by the end node.

20. The non-transitory computer-readable storage medium according to claim 17, wherein before processing, by using the first control model, the transmission parameter of the first network accessed by the end node, to obtain the first control parameter required for sending the data packet of the first application by the end node by using the first network, the processor is further configured to:
   determine the transmission parameter of the first network based on at least one of a current status parameter of the first network and a historical status parameter of the first network.

* * * * *